United States Patent Office 3,025,704
Patented Mar. 20, 1962

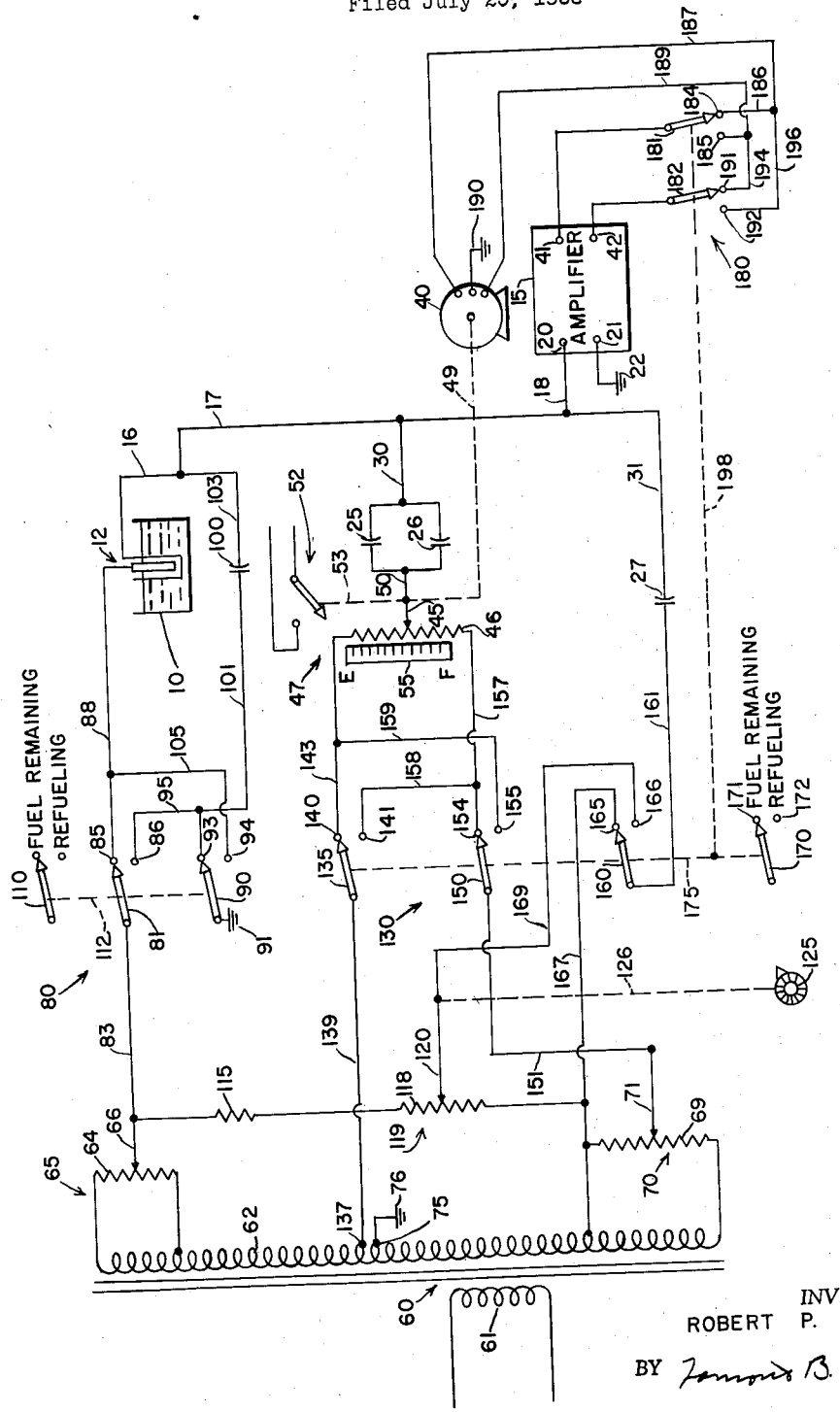

1

3,025,704
FLUID QUANTITY CONTROL APPARATUS
Robert P. Pearson, Roseville, Minn., assignor to Minneapolis-Honeywell Regulator Company, Minneapolis, Minn., a corporation of Delaware
Filed July 25, 1958, Ser. No. 750,928
8 Claims. (Cl. 73—304)

The present invention is concerned with control apparatus and more particularly with a control circuit for indicating and controlling the quantity of fluid added to or subtracted from a fluid storage means.

The present invention is particularly adapted for use with an aircraft when refueling is necessary and is adapted to measure the quantity of fluid in the containing means, to provide means for setting a desired quantity to be added or the desired quantity to be contained in the container and to give indication when that desired amount has been so added.

Such apparatus is particularly useful on aircraft having a long flight schedule with various intermediate refueling stops. On each such refueling stop the aircraft normally has a certain amount of fuel remaining in its tanks and desires an adequate amount of fuel to take it to its next refueling stop. The pilot and the ground refueling crew want to know both the amount of fuel to be added and the amount of fuel in the tanks after addition. In the apparatus of the present invention this information is provided. Also included are means to give a signal or to stop the pumping process when the desired amount of fuel has been added so that human error in refueling process can be minimized.

It is therefore an object of the present invention to provide an improved control apparatus for measuring the quantity of fuel withdrawn from a fluid storage means and for measuring and controlling the amount of fluid subsequently added to the fuel storage means.

Other objects of the present invention will become apparent upon reference to the following specification, claims, and drawing, of which the single FIGURE is a schematic representation of the present invention.

Referring to the figure, the reference numeral 10 designates a fuel tank which may be one of a number of fuel tanks located in an aircraft. Associated with the tank 10 is a capacitive type sensing element 12 which produces a signal having a first phase and being of a magnitude indicative of the amount of fuel or fluid in the tank 10. This signal is presented to an amplifier 15 by means of conductors 16, 17 and 18 and input terminal 20. The other input terminal 21 is connected to ground reference at 22.

Signals of a phase opposite to the above mentioned first phase are presented by capacitors 25, 26, and 27 by means of conductors 30, 31 and 18 to terminal 20 of amplifier 15. These signals are used, in a manner well known in the art, to balance the signal from the sensor 12.

A phase sensitive motor 40 is connected to the output terminals 41 and 42 of amplifier 15 by means of a connection to be later described. Motor 40 controls the position of a wiper 45 associated with the winding 46 of a potentiometer 47 by means of a mechanical connection shown as dashed line 49. The purpose of this connection is to vary the magnitude of the signal coming from the capacitors 25 and 26 to which the wiper 45 is connected by means of a conductor 50 so as to provide a rebalance circuit. Motor 40 is also shown connected to a switch 52 by a mechanical connection shown as dashed line 53. Switch 52 may be used to provide a signal to control a pump or valve and thus regulate the flow of fuel to the tank 10. When motor 40 has reached a predetermined position of course, the mechanical connection could directly control a pump or valve, or the switch

2

52 could merely provide an indication signal and the operator would then manually control the refueling operation.

Associated with the wiper 45 of the potentiometer 47 is an indicator scale 55 which is calibrated in terms of fluid quantity and which normally indicates the amount of fluid in the tank 10 according to the position of wiper 45 thereon.

The source of power for this system is provided by a transformer 60 having a primary winding 61 which is connected to a source of alternating current (not shown). A secondary winding 62 of transformer 60 has a resistance winding 64 of a potentiometer 65 connected across an upper portion thereof. Potentiometer 65 has a movable wiper 66 associated therewith which is used for purposes of empty adjustment as is well known in the art.

A resistance winding 69 of a potentiometer 70 is connected across the lower portion of transformer secondary 62. The potentiometer 70 has a movable wiper 71 associated therewith and is used for purposes of full adjustment as is known in the art.

Secondary winding 62 has a center tap 75 which is connected to ground reference at 76. The upper portion of secondary 62 can therefore be thought of as having a voltage across it of a first phase while the lower portion of the secondary 62 can be thought of as having the voltage there across of a phase opposite to the first phase, these voltages being with respect to ground reference.

A first switch means shown generally by reference numeral 80 has a first switch arm 81 which is connected to the movable wiper 66 of potentiometer 65 by means of a conductor 83. Associated with switch arm 81 are two terminals 85, 86. The arm 81 is shown in the figure as contacting terminal 85 which is in turn connected to the capacitive type sensor by means of conductor 88. A second switch arm 90 of switch means 80 is connected to ground reference at 91. Associated with switch arm 90 are two terminals 93 and 94. Switch arm 90 is shown in the figure as contacting terminal 93 which in turn is connected to terminal 86 by means of conductor 95 and is connected to a capacitor 100 by means of a conductor 101. The other side of capacitor 100 is connected to the input terminal 20 of amplifier 15 by means of conductors 103, 17 and 18. The magnitude of capacitor 100 is substantially equal to the empty tank capacitance of the sensor 12 for purposes to be later described. Terminal 94 associated with switch arm 90 is connected to terminal 85 by means of conductor 105.

An actuating arm 110 of switch 80 is manually controllable and in the position shown indicates that the circuit is operating in the fuel remaining position. A mechanical connection shown as dashed line 112 in the figure connects the switch arms 81, 90, and 110 together so that upon manual operation of arm 110 to its second position, switch arms 81 and 90 also move to their second position. In the second position arm 110 would point to the terminal indicating that the refueling operation of the circuit was being undertaken and the capacitor 100 would be substituted for the sensor 12 in the circuit.

Connected between the movable wiper 66 of potentiometer 65 and the upper end of potentiometer winding 69 is a series resistance circuit comprising a resistor 115 and a resistance winding 118 of a potentiometer 119 having a movable wiper 120. The purpose of resistor 115 is to establish a predetermined voltage across the winding 118 but it should be noted that the upper end of winding 118 could also be connected to a position on the secondary winding 62 to achieve the same result. The movable wiper 120 of potentiometer 119 can be manually positioned by means of a knob 125 operating through a mechanical connection shown as dashed line 126.

A second switch shown generally at 130 will now be described. Switch 130 has a first switch arm 135 which is shown connected to secondary winding 62 at a point 137 just above ground tap 75 by means of a conductor 139. Associated with switch arm 135 are two terminals 140 and 141. Switch arm 135 is shown in the figure as contacting terminal 140 which in turn is connected to the upper end of the winding 46 of potentiometer 47 by means of conductor 143.

A second switch arm 150 of switch 130 is connected by means of conductor 151 to the movable wiper 71 of potentiometer 70. Associated with switch arm 150 are two terminals 154 and 155. Switch arm 150 is shown in the figure as contacting terminal 154 which is connected by means of conductor 157 to the lower portion of winding 46 of potentiometer 47. Terminal 154 is also connected to terminal 141 by means of a conductor 158. The other terminal 155 associated with switch arm 150 is connected to terminal 140 by means of a conductor 159. It is seen that movement of the switch arms 135 and 150 to their second position effectively reverses the winding 46 with respect thereto. The purpose of this will be described further on.

A third switch arm 160 is connected by means of conductor 161 to capacitor 27. Associated with switch arm 160 are two terminals 165 and 166. Switch arm 160 is shown contacting terminal 165 which is in turn connected to the upper portion of winding 69 of potentiometer 70 by means of a conductor 167. Terminal 166 is connected to the movable wiper 120 of potentiometer 119 by means of a conductor 169.

A manually movable actuating arm 170 is associated with two positions 171 and 172. In the position shown actuating arm 170 indicates that the circuit is in the fuel remaining position, and when in the other position actuating arm 170 indicates that the circuit is in the refueling phase of operation. Movement of switch arm 170 produces movement of switch arms 135, 150, 182, 181 and 160 by means of a mechanical connection shown as dashed line 175 and 198.

A third switch shown generally as 180 has two switch arms 181 and 182 which are connected to output terminals 41 and 42 respectively of amplifier 15. Associated with switch arm 181 are two terminals 184 and 185. In the position shown switch arm 181 is contacting terminal 184 which is in turn connected to one terminal of the phase responsive motor 40 by means of conductors 186 and 187. Terminal 185 is connected to the other input terminal of the phase sensitive motor 40 by means of a conductor 189. A third terminal of motor 40 is connected to ground reference at 190.

Associated wtih switch arm 182 are terminals 191 and 192. In the position shown, switch arm 182 is contacting terminal 191 which is in turn connected to terminal 185 by means of a conductor 194. Terminal 192 is connected to terminal 184 by means of a conductor 196. It is seen that switch 180 accomplishes the reversal of the connections from the amplifier 15 to the motor 40 so that motor 40 will operate in a reverse direction with a given phase of signal from amplifier 15 upon movement of switch arms 181 and 182. Movement of the switch arms 181 and 182 is accomplished by means of the manually movable switch arm 170 by means of a mechanical connection shown as dashed line 198. It is noted that operation of the manually movable switch arm 170 causes movement of wiper arms 135, 150, 160, 181, and 182 simultaneously. This is seen to effect a reversal of the winding 46 associated with potentiometer 47 with respect to switch arms 135 and 150, to effect reversal of motor 40 as above described, and to change the connection from the capacitor 27 from the upper portion of the winding 69 of potentiometer 70 to the wiper 120 of potentiometer 119. Switch 80 accomplishes the introduction of sensing capacitor 12 into the circuit and the grounding of capacitor 100 or vice versa depending upon which position it is in.

The operation of the above described circuit will now be explained. In the position shown the circuit operates in the same manner as the standard three wire capacitive type liquid level bridge. A signal of a first phase is fed to the capacitive sensor 12 from the secondary winding 62 by means of conductor 83, switch arm 81, conductor 88, and a signal of a first phase indicative of the amount of liquid in the container 10 is presented to the amplifier input terminal 20 by means of conductors 16, 17 and 18. The rebalance potentiometer 47 is connected across a lower portion of transformer 62 by means of conductors 139, switch arm 135, conductor 143 and by wiper 71 of potentiometer 70, conductor 151, switch arm 150 and conductor 157. In this manner a voltage of a phase opposite to the above mentioned first phase is present across the winding 46 of potentiometer 47. Part of this voltage is picked off by the moveable wiper 45 of potentiometer 47 and is fed through capacitors 25 and 26 and conductors 30 and 18 to the input terminal 20 of amplifier 15. Also connected from the lower portion of transformer secondary 62 by means of conductors 167, switch arm 160, conductor 161 is capacitor 27 which then produces a signal also of a phase opposite to the first above mentioned phase by means of conductors 31 and 18 to the input terminal 20 of amplifier 15. The phase sensitive motor 40 is connected across the output of the amplifier 15 and drives wiper 45 by means of mechanical connection 49 to such a position along the winding 46 of potentiometer 47 that the magnitude of the voltage presented to amplifier terminal 20 from capacitors 25, 26 and 27 is equal to the magnitude of the voltage presented to the amplifier terminal 20 from capacitive sensor 12. When these voltages are equal the amplifier 15 sees no input voltage since the phase coming from these sources is opposite. At this position the motor 40 stops and the position then of wiper 45 along the indicator scale 55 is indicative of the amount of fuel remaining in tank 10.

Now assuming that the aircraft lands and desires to take on an amount of fuel necessary to enable it to fly to its next refueling station. For the moment assume that switch 80 remains in the position shown and that switch 130 is moved to its second position. By changing the position of switch 130 to the refueling position, switch arm 135 contacts terminal 141 and switch arm 150 contacts terminal 155. This effectively reverses the connections of the windings 46 of potentiometer 47 with respect to that portion of the transformer secondary 62 across which it is connected. By doing this, wiper 45 will see an increase in voltage with respect to ground as it moves toward empty rather than a decreased voltage. Switch arm 160 contacts terminal 166 which disengages capacitor 27 from the upper end of potentiometer winding 69 of potentiometer 70 and places this connection on wiper 120 of potentiometer 119.

The voltage across the winding 118 of potentiometer 119 is set by correctly choosing the resistor 115 so that the voltage across it is sufficient to allow full scale movement of wiper 45 of potentiometer 47 and still obtain balanced conditions. If wiper 120 is at the bottom portion of winding 118 of potentiometer 119 the voltage on capacitor 27 will not change when switch 130 is operated, but for any other position of the wiper 120 on winding 118 the voltage of the phase opposite to the first phase presented to the amplifier is decreased. The motor 40 has also been reversed with respect to amplifier 15 so that when switch 130 is operated a signal which was of phase to drive it towards empty now causes it to drive towards full. It can be seen then that movement of wiper 120 will decrease the signal of phase opposite to the first phase so that motor 40 will drive wiper 45 of potentiometer 47 towards the empty position which now increases the signal of the phase opposite to the first phase until balance is again reached. It is seen that movement of wiper 120 thus controls the position of wiper 45.

The operator then by twisting knob 125 moves wiper 120 of potentiometer 119 until wiper 45 is positioned on indicator scale 55 at the amount of fuel which is desired to be added. Then as fuel is added to the tank 10 wiper 45 drives towards empty rather than towards full and when wiper 45 reaches the empty mark motor 40 operates a limit switch or like device by means of mechanical connection 53 which in turn shuts off the pumping operation or closes a valve and stops the fuel flow to tank 10.

It is noted that in the above described operation the operator sets the wiper 120 to such a position that wiper 45 indicates the fuel which is to be added. If it is desired to set the wiper 45 to a position that indicates the total amount of fuel desired in the tanks and thus prevent the necessary subtraction on the operator's part, switch 80 comes into play. If at the start of the refueling cycle the operator depresses the switch 80 to its second position, he in effect grounds out the signal from the capacitive sensor 12 and substitutes the capacitor 100 instead. Capacitor 100 being of a size equal to the empty tank capacitance of sensor 12 introduces a signal to amplifier 15 which is of a magnitude indicating that the tank 10 is empty. The operator then sets the switch 130 in its refueling position and operates knob 125 until wiper 120 is positioned so as to cause wiper 45 to indicate the amount of fuel he desires in the tanks. At this time the operator returns switch 80 to its original position and thus puts capacitor sensor 12 back in a circuit and takes out the capacitor 100. The amplifier then suddenly sees an amount of fuel in tank 10 equal to the amount that was in there when the aircraft landed and causes the motor 40 to drive wiper 45 towards empty by that amount. At this point wiper 45 is indicating the amount which is desired to be added and as the fueling process continues wiper 45 continues down towards empty at which point the limit switch operates and the correct amount of fuel has been added to the tanks. It should be understood that switch 80 is only necessary if it is desired to eliminate the mental subtraction on the part of the operator in subtracting the amount of fuel already in the tanks from the amount desired in the tanks to arrive at the amount to be added.

From the above description it should be obvious to one skilled in the art that many modifications could be made to the invention and it is not my intention to be limited strictly by the disclosure. For example, potentiometer 118 could be connected to some tap on winding 62 where an adequate voltage would be obtained thereacross. Also switch 80 need not necessarily be in the circuit. Instead of reversing the connections from amplifier 15 to motor 40 the motor 40 could be reversed by mechanical means or the line phase windings of the motor could be reversed. Also winding 46 of potentiometer 47 need not physically be reversed providing some method is arranged for causing the wiper to progress towards empty rather than towards full upon filling of the tanks. Such a system might include a reversible mechanical connection which is operated by the switch 130.

I therefore desire my invention to be limited only by the following claims.

I claim:

1. Apparatus of the class described comprising, in combination: a first source of alternating voltage; fluid responsive means connected to said first source of alternating voltage for producing a signal of a first phase and of magnitude indicative of the quantity of fluid in a container; voltage responsive means having an input; means connecting said fluid responsive means to the input of said voltage responsive means to apply the signal of said first phase thereto; a second source of alternating voltage of a phase opposite to the first source of alternating voltage; a first and a second potentiometer each having a movable tap and each having a resistance winding; means connecting each of said potentiometers to said second voltage source so that movement of the movable tap of either potentiometer does not affect the voltage across the other potentiometer resistance winding; further means connecting the movable tap of said first potentiometer to the input of said voltage responsive means to apply a signal of a second phase opposite to said first phase thereto; and switch means operable in a first position to connect the movable tap of said second potentiometer to said further means and operable in a second position to disconnect the movable tap of said second potentiometer from said further means.

2. Apparatus for use with fluid containing means comprising, in combination: a first source of alternating voltage; level sensing means associated with the containing means and connected to said first source of alternating voltage for providing an electrical signal having a first phase and of magnitude indicative of the quantity of fluid being sensed; voltage responsive means having an input; means connecting said sensing means to the input of said voltage responsive means to apply the electrical signal of the first phase thereto; a second source of alternating voltage having a phase opposite to the first source of alternating voltage; a first and a second potentiometer each having a movable tap; means connecting said first and second potentiometer substantially in parallel across said second voltage source; conductive means connecting the movable tap of said first potentiometer to the input of said voltage responsive means to apply a voltage of a second phase opposite to the first phase thereto; switch means having at least two positions operative to reverse the connection of said first potentiometer across said second voltage source and to connect the movable tap of said second potentiometer to said conductive means to thereby alter the magnitude of the voltage of the second phase presented to the input of said voltage responsive means.

3. Apparatus for use with fluid containing means comprising, in combination: a first source of alternating voltage; sensing means associated with the containing means and connected to said first source of alternating voltage for providing an electrical signal of a first phase and of magnitude indicative of the quantity of fluid being sensed; voltage responsive means having an input and an output; common conductive means connecting said sensing means to the input of said voltage responsive means to apply the signal of the first phase thereto; a second source of alternating voltage of a phase opposite to said first source of alternating voltage; switch means having at least two positions; a first and a second potentiometer each having a movable tap; means including said switch means in a first position connecting said first potentiometer to said second voltage source for energization thereby; means connecting said second potentiometer in substantially parallel relationship with said first potentiometer to said second voltage source for energization thereby; conductive means connecting the movable tap of said first potentiometer to said common conductive means to apply a signal of a second phase opposite to the first phase to the input of said voltage responsive means; driving means connected to the output of said voltage responsive means to be controlled thereby and operable to position the wiper of said first potentiometer; and means including said switch means in a second position operable to reverse the connection of said first potentiometer to said second voltage source, to reverse the sense of operation of said driving means, and to connect the movable tap of said second potentiometer to said common conductive means.

4. Apparatus for use with a fluid containing means comprising, in combination: a source of alternating voltage having a first and a second end terminal and a third terminal intermediate the end terminals; level sensing means having an input and an output; means connecting the input of said level sensing means to the first end terminal of said voltage source; voltage responsive means having an input and an output; means connecting the output of said level sensing means to the input of said voltage responsive means; a first potentiometer having a winding and a movable tap; switch means having a first and a second position; means including said switch means in the first position connecting the second end terminal of said voltage source to the input of said voltage responsive means and connecting the winding of said first potentiometer between the second end terminal and the third terminal of said voltage source; a second potentiometer having a winding and a movable tap; means connecting the winding of said second potentiometer between the first and second end terminals of said voltage source; drive means connected to the output of said voltage responsive means and operable to drive the movable tap of said first potentiometer in a first direction upon a loss of fluid from the containing means; means connecting the movable tap of said first potentiometer to the input of said voltage responsive means; and means including said switch means in a second position connecting the winding of said first potentiometer in reverse sense between the third terminal and the second end terminal of said voltage source, disconnecting the second end terminal of said voltage source from the input of said voltage responsive means, connecting the movable tap of said second potentiometer to the input of said voltage responsive means and reversing the operation of said drive means so that the wiper of said first potentiometer moves in the first direction upon addition of fluid to the containing means.

5. Liquid level responsive apparatus comprising, in combination: a source of alternating voltage having a first and a second terminal and a third terminal connected intermediate the first and second terminals; capacitive level sensing means; first switch means having a first and a second position; voltage responsive means having an input and an output; a first capacitor; means including said switch means in the first position connecting said sensing means between the input of said voltage responsive means and the first terminal of said voltage source; means including said switch means in the second position for substituting said first capacitor for said sensing means; a first potentiometer having a winding and a movable tap; drive means connected to the output of said voltage responsive means operable to move the movable tap of said first potentiometer; means connecting the movable tap of said potentiometer to the input of said voltage responsive means; a second potentiometer having a winding and a movable tap; means connecting the winding of said second potentiometer between the first and second terminals of said voltage source; second switch means having a first and a second position, said switch means operable in the first position to connect the winding of said first potentiometer between the second and third terminals of said voltage source and operable in the second position to connect the winding of said first potentiometer in reverse sense between the second and third terminals of said voltage source and to connect the movable tap of said second potentiometer to the input of said voltage responsive device.

6. Apparatus for use with fluid containing means comprising, in combination: a rebalanceable fluid level sensing bridge, a first leg of which has a first source of voltage and a capacitance type liquid level sensor connected therein, a second leg of which has a source of rebalancing signal voltage connected therein, and a third leg of which has a second source of voltage and a fixed capacitor connected therein; a third source of voltage; and swtich means connected in the third leg operable to remove the second source of voltage therefrom and to substitute the third source of voltage therefor.

7. Apparatus for controlling a condition, comprising, in combination: first means producing a first electrical signal of a first phase and of magnitude indicative of the condition being controlled; second means producing a second electrical signal of a second phase opposite to the first phase and of variable magnitude; voltage responsive means having a first input terminal and an output member movable through a range of positions; first conductive means connecting said first and second means to the first input terminal of said voltage responsive means to apply said first and second signals thereto; means connecting the output member of said voltage responsive means to said second means to control the variable magnitude thereof; means associated with the output member of said voltage responsive means indicating the position thereof; dividing means having a movable member for producing an additional signal on the movable member of the second phase and of variable magnitude; second conductive means connecting the movable member to the first input terminal of said voltage responsive means, variations in the magnitude of the additional signal causing movement of the output member to a position indicative of a desired state of the condition being controlled and whereby further changes in the condition cause signals to be presented to the first input terminal of said voltage responsive device to move the output member of said voltage responsive device toward a predetermined position; and means operable by the output member in the predetermined position to prevent further change in the condition.

8. Apparatus for setting a fluid quantity indicator at a desired value so that as fluid is added to a container with which the indicator is associated the indicator shows less fluid, and when the indicator shows empty, the desired amount of fluid is present in the container, comprising: first means having an electrical signal output of a first phase and of magnitude indicative of the quantity of fluid in the container; second means having an electrical signal output of a second phase opposite the first phase and of variable magnitude; common conductor means joining the outputs of said first and second means; voltage responsive means having an input and an output; conductor means connecting said common conductor means to the input of said voltage responsive means; drive means connected to the output of said voltage responsive means to be controlled thereby and operative to adjust the magnitude of the signal from said second means; indicator means associated with said drive means and calibrated in terms of fluid quantity, said indicator means operable by said drive means to move towards an empty indication when a signal of the first phase is present at the input of said voltage responsive means and towards a full indication when a signal of the second phase is present at the input of said voltage responsive means; potential dividing means having a movable member for producing an electrical signal output on the movable member of the second phase and of magnitude variable independently of the signal from said second means, said movable member being connected to said common conductor means; and means connected to said movable member for varying the magnitude of the signal from said potential dividing means.

References Cited in the file of this patent

UNITED STATES PATENTS

| | | |
|---|---|---|
| 2,866,337 | Minneman et al. | Dec. 30, 1958 |
| 2,867,120 | Schafer | Jan. 6, 1959 |
| 2,872,811 | Bergeson | Feb. 10, 1959 |
| 2,899,825 | Adams et al. | Aug. 18, 1959 |